(12) United States Patent
Golchin

(10) Patent No.: US 8,273,154 B2  
(45) Date of Patent: Sep. 25, 2012

(54) FIRE BRICK MERCURY REMOVAL PROCESS FROM FLUE GAS

(76) Inventor: Johanshir Golchin, Ames, IA (US)

( * ) Notice: Subject to any disclaimer, the term of this patent is extended or adjusted under 35 U.S.C. 154(b) by 116 days.

(21) Appl. No.: 12/784,877

(22) Filed: May 21, 2010

(65) Prior Publication Data

US 2011/0072966 A1   Mar. 31, 2011

Related U.S. Application Data

(60) Provisional application No. 61/219,933, filed on Jun. 24, 2009.

(51) Int. Cl.  
*B01D 53/02* (2006.01)

(52) U.S. Cl. ............................ 95/134; 96/108; 96/154

(58) Field of Classification Search .............. 95/134; 96/108, 154

See application file for complete search history.

(56) References Cited

U.S. PATENT DOCUMENTS

| | | | | |
|---|---|---|---|---|
| 5,610,117 | A * | 3/1997 | Horiuchi et al. | 502/324 |
| 6,027,697 | A * | 2/2000 | Kurihara et al. | 422/171 |
| 6,287,527 | B1 * | 9/2001 | Kawanami et al. | 423/213.2 |
| 7,214,331 | B2 * | 5/2007 | Jiang et al. | 252/373 |
| 2006/0011115 | A1 * | 1/2006 | Breen et al. | 110/345 |
| 2006/0178258 | A1 * | 8/2006 | Gadkaree et al. | 501/124 |
| 2008/0264047 | A1 * | 10/2008 | Griffiths et al. | 60/299 |
| 2009/0041635 | A1 * | 2/2009 | Berkey et al. | 422/177 |
| 2009/0249954 | A1 * | 10/2009 | Gadkaree et al. | 95/134 |

* cited by examiner

*Primary Examiner* — Duane Smith  
*Assistant Examiner* — Christopher P Jones  
(74) *Attorney, Agent, or Firm* — McKee, Voorhees & Sease, P.L.C.

(57) ABSTRACT

A method and system for removal of in most instances 70% of mercury contamination from flue gas and in many instances 90-95%. It involves passing hot flue gas through a honeycomb filter brick comprising a ceramic honeycomb of $MgAl_2Si_2O_8$, preferably containing minor amounts of Iron, Platinum and Titanium.

1 Claim, 3 Drawing Sheets

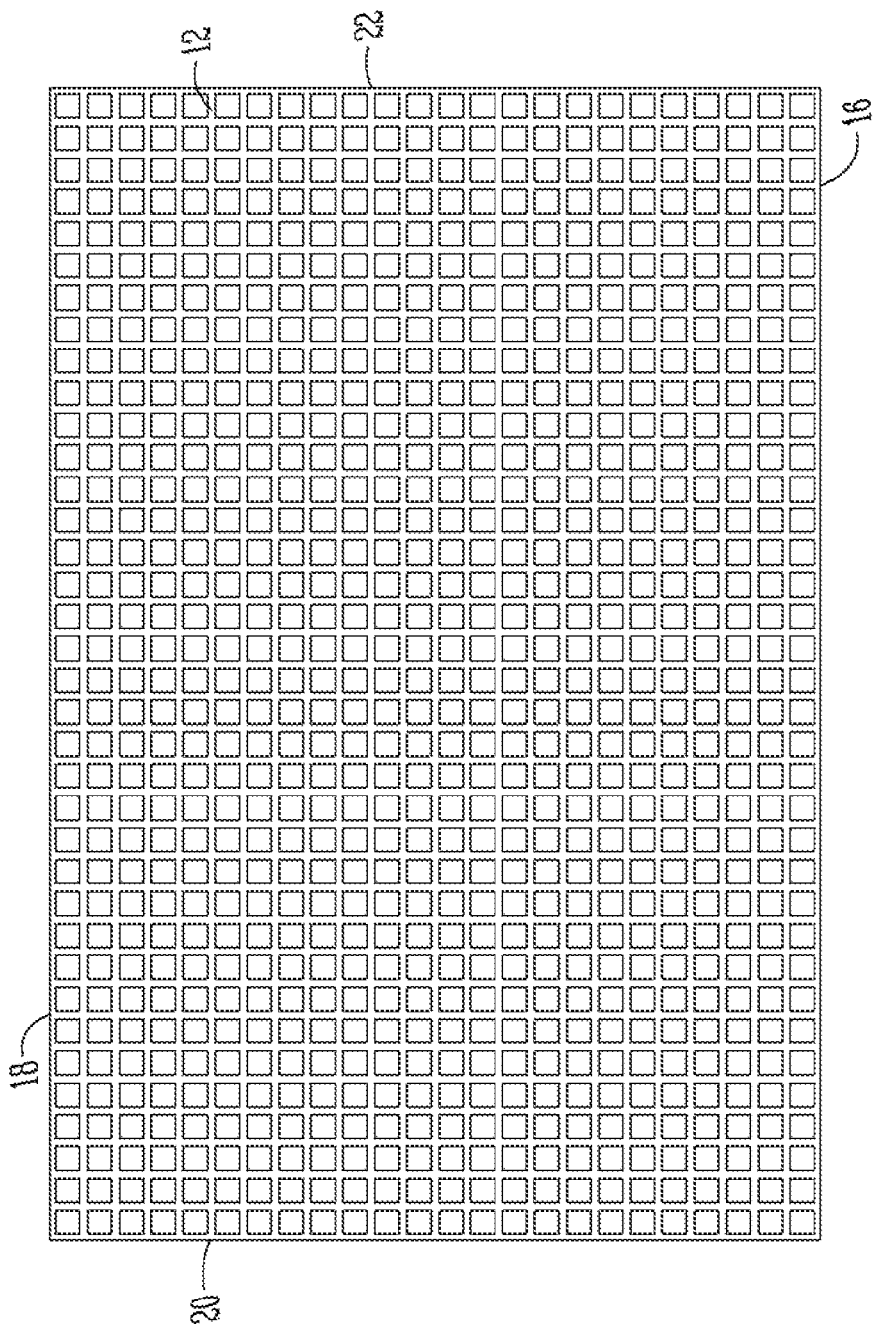

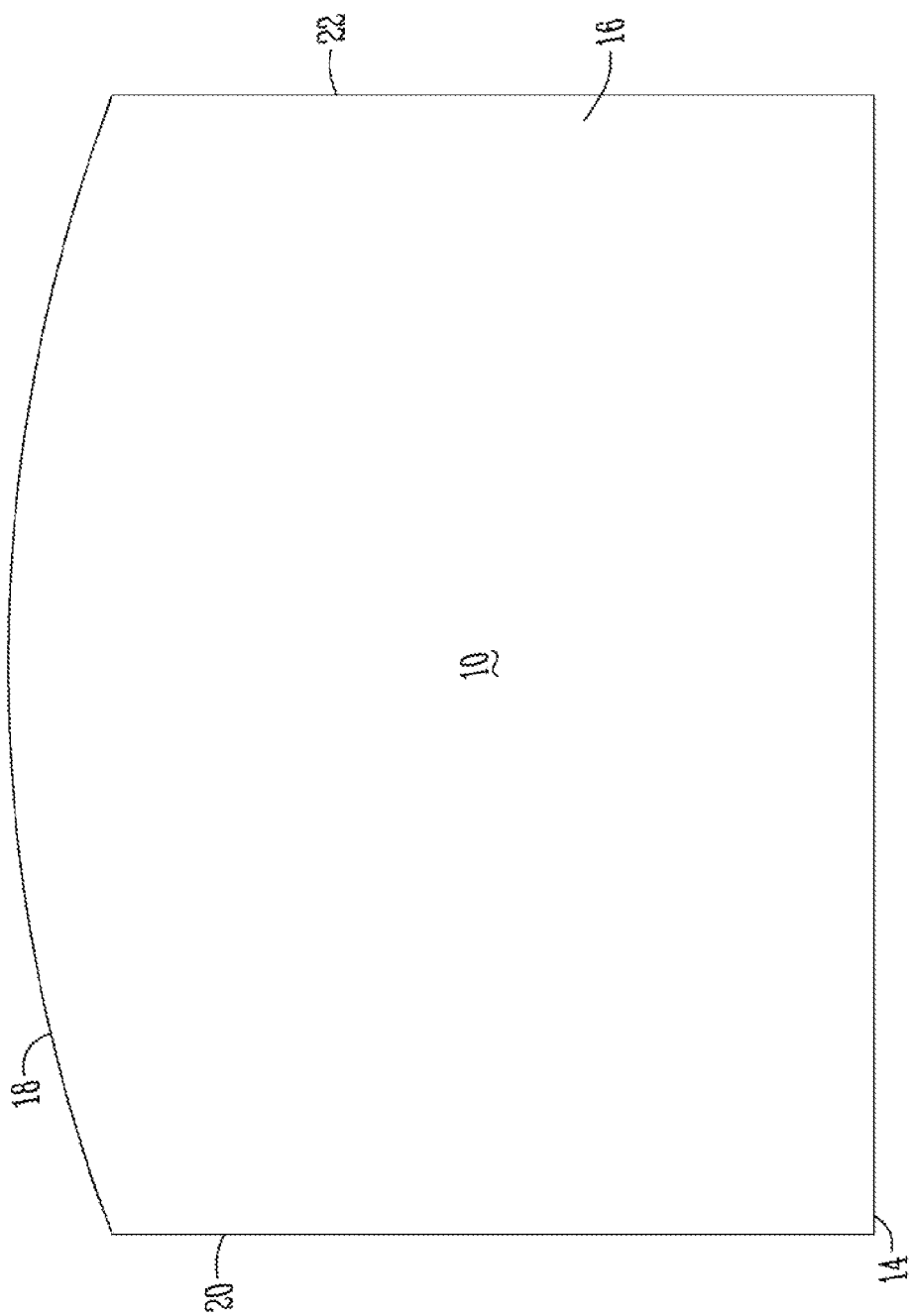

FIRE BRICK MERCURY REMOVAL PROCESS FROM FLUE GAS

CROSS-REFERENCE TO RELATED APPLICATIONS

This application claims priority under 35 U.S.C. §119 to provisional application Serial No. 61/219,933 filed Jun. 24, 2009, herein incorporated by reference in its entirety.

BACKGROUND OF THE INVENTION

It has been said that more than 32% of the mercury emitted in the United States to the atmosphere is from coal-burning utilities. Should further mercury control emissions from municipal solid waste and medical waste incinerators be mandated, the percentage of mercury released to the atmosphere from coal-burning utilities would greatly increase. A low concentration of mercury, on the order of 1 part per billion by volume (ppbv), is found in flue gas when coal is burned. The primary forms of mercury in the flue gas are elemental mercury and oxidized mercury (believed to be mercuric chloride).

U.S. Pat. No. 6,521,021 represents an example of the Thief Process for removal of mercury from flue gas. The Thief Process is a cost-effective variation to activated carbon injection (ACI) for removal of mercury from flue gas. In this scheme, partially combusted coal from the furnace of a pulverized coal power generation plant is extracted by a lance and then re-injected into the ductwork downstream of the air preheater. Recent results on a 500-lb/hr pilot-scale combustion facility show similar removals of mercury for both the Thief Process and ACI.

Another process is represented by U.S. Pat. No. 6,447,740 which is directed to a process for chlorine oxidizing gaseous pollutants in the flue gas stream water to soluble chlorides and then using a water scrubbing process. In particular, chlorine is injected to oxidize pollutants of the flue gas stream and then in oxidized form they are more readily available for removal.

Many of the above described processes have been in place in mercury removal processing but with the Mar. 15, 2005 EPA issued final Clean Air Mercury Rule, there is a continuing need for further developments of cheap and effective ways of eliminating mercury from flue gas. Especially since worldwide it has been estimated that two-thirds of the mercury air emissions are anthropogenic (human caused emissions). As previously stated, there are a number of currently available control technologies that coal-fired power plants can use to reduce their emissions of mercury to the atmosphere. For example, controls for sulfur dioxide, oxides of nitrogen and small particles that have already been installed remove some of the mercury before it is released from the stack. The effectiveness of these technologies for mercury removal varies, depending on characteristics of the coal and the configuration of the power plant. In some cases a plant might consider changing the type of coal that it burns in order to get better mercury control from its existing control devices.

Control technologies specifically used to reduce mercury emissions from coal fired power plants have recently begun to be used on some power plants with success. The most highly advanced technology, activated carbon injection has been used on facilities that burn municipal solid waste for the past decade. Particles of activated carbon are injected into the exit gas flow, downstream of the boiler. The mercury attaches to the carbon particles and is removed in a traditional particle control device. Several other control technologies to reduce mercury emissions from coal-fired power plants are being developed and tested, such as those of the above-mentioned patents, but have not yet been deployed at the commercial scale.

To date, the processes developed have been very expensive and complex. For example, U.S. Pat. No. 6,447,740 reports that the costs of capturing mercury can be as high as $100,000/lb.

It can be seen that there is a need for continuing efforts, especially since recent nutritional emphasis on fish eating as important to a healthy diet have become part of the lowering of cholesterol campaign. Fish are important in a healthy diet. They are a lean, low-calorie source of protein. However, some fish may contain methylmercury or other harmful chemicals at sufficiently high levels to be a concern. Federal, state and local governments issue fish consumption advisories when the fish are unsafe to eat. The advisories may suggest that people avoid eating certain kinds or certain amounts of fish. Some advisories apply to specific water types (like lakes). Some may focus on groups of particularly sensitive people. Some advisories include notices of "no restriction" to tell us that certain fish are safe to eat. As states increase the waters they monitor for contaminated fish, both the number of advisories and the waters where it is safe to eat fish are increasing. Elimination of flue gas In short, there is a government mandated incentive to develop less costly, more effective methods of removing mercury from flue gas, especially from coal fired power plants, but also from medical incinerators and the like.

The primary objective of the present invention is to develop a new cost effective, easy to install flue gas mercury removal system which in nearly all instances, removes 70% of the mercury and in most instances 90-95% of the mercury.

The method of accomplishing the above primary objective will be apparent from the following detailed description of the invention.

BRIEF SUMMARY OF THE INVENTION

A method and system for removal of in most instances 70% of mercury contamination from flue gas and in many instances 90-95%. It involves passing hot flue gas through a honeycomb filter brick comprising a ceramic honeycomb of $MgAl_2 Si_2O_8$, preferably containing minor amounts of Iron, Platinum and Titanium.

BRIEF DESCRIPTION OF THE DRAWINGS

FIG. 2 is a front view of the honeycombed fire brick.

FIG. 3 is an elevated side view showing the arched (slightly convex) honeycombed front surface.

DETAILED DESCRIPTION OF THE PREFERRED EMBODIMENT

Figure 1:
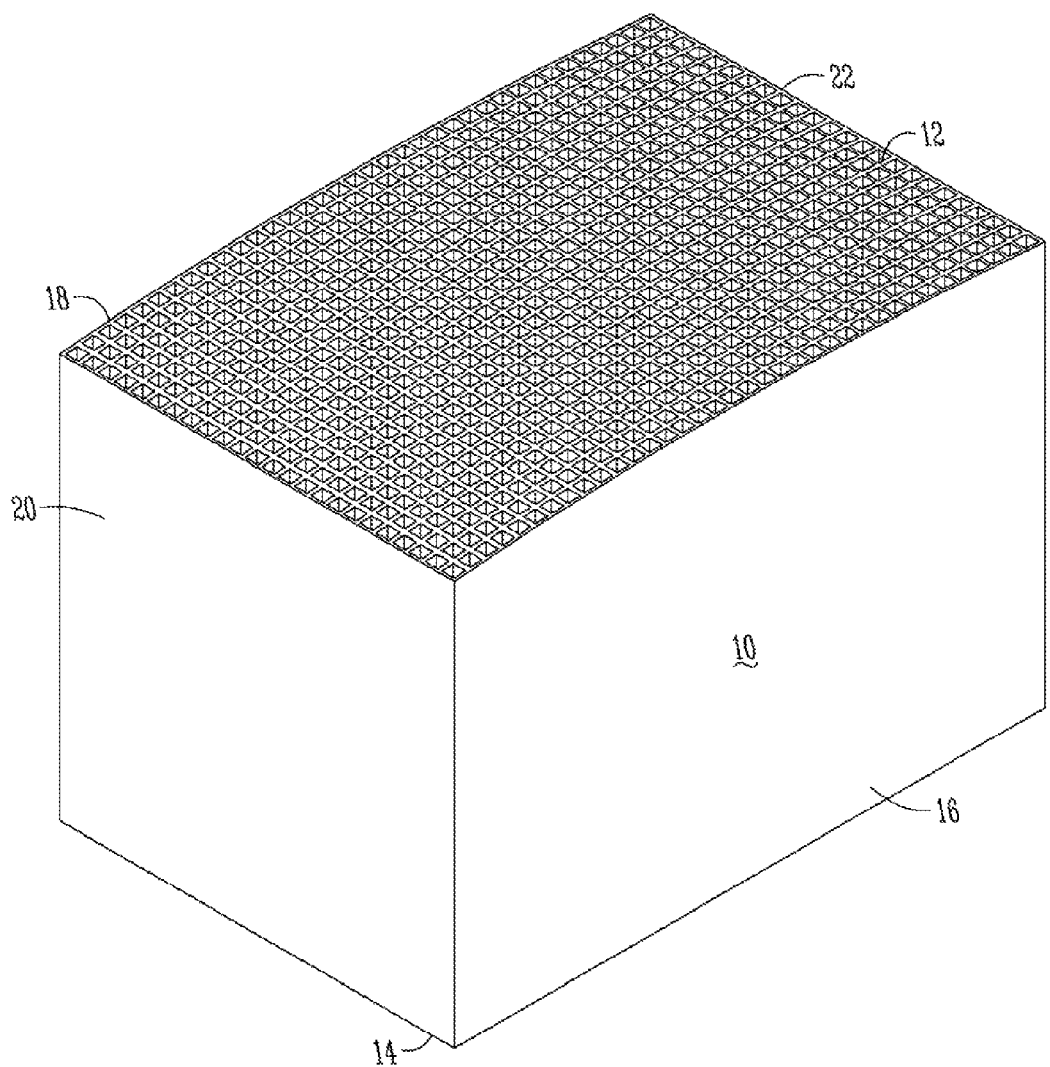
FIG. 1 is a perspective view of the ceramic fire brick.

Looking first at FIG. 1, honeycomb filter brick 10 has a honeycomb top surface 12 and a similar honeycomb bottom surface 14, to solid ceramic sides 16, 18, 20 and 22. The brick honeycomb top surface 12 is arched to present a slightly concave arched surface which is best illustrated in FIG. 3.

The brick itself is made by conventional fire brick ceramic molding and firing and has a basic composition of $MgAl_2 Si_2O_8$. It is an aluminum-rich material with some minor amounts of Platinum, Titanium and Iron present. As used herein minor amounts means less than a majority. Generally the amount of Platinum is within the range of 0.5 atomic weight % to 1.5 atomic weight %, preferably about 1.0 atomic weight %. The amount of Titanium is within the range of 0.05 atomic weight % to 0.15 atomic weight %, preferably about 0.075% to 0.085 atomic weight %, and the amount of Iron is within the range of 15 atomic weight % to 25 atomic weight %, preferably about 20% to about 25%. Each individual fire brick is preferably 100 mm tall from the bottom surface to the top surface and 150 mm wide from the narrower side 20 to the other like narrow side 22. Additionally the top surface 12 has 36 porous chambers along its length and 24 chambers along its width.

The number of honeycomb filter ceramic fire bricks used will depend upon the configuration of the power plant chimney. Generally they will be stacked like bricks in a frame specifically dimensioned to fit within the specific site chimney. A stacked framework or cartridge of honeycomb fire bricks is erected so that the hot flue gas, generally on the order of 340° F. hits the top surface 22 first. This allows for equal distribution of the flow, since the velocity on the sides is slower than the velocity in the center. As a result the flow is spread equally distributed through the fire bricks 10.

As the flue gas flows through the porous honeycombed ceramic fire brick filter, mercury is absorbed onto the filter. In trial runs with laboratory use of the fire brick, in every instance more than 70% of the mercury is removed and, in most instances 90-95% of the mercury is removed.

It is not known why this filter is so effective but it is believed to be a combination of the nature of the ceramic and its geometry, with the small amounts of Platinum being present to allow mercury displacement. Other ceramic formulations have not proved as successful as the one herein described.

What is claimed is:

1. A method of removal of 70% or more of mercury contamination from power plant flue gas, comprising:
    passing hot flue gas through a honeycomb filter brick prior to said gas escaping into the atmosphere;
    said filter brick comprising a ceramic honeycomb of $MgAl_2Si_2O_8$, containing a mercury absorbing enhancing effective amount of an element selected from the group consisting of Iron, Platinum, and Titanium.

* * * * *